Jan. 5, 1965   G. E. HOLLAR   3,163,959
FISH FEEDING DEVICE
Filed Sept. 20, 1963

George E. Hollar
INVENTOR.

United States Patent Office 3,163,959
Patented Jan. 5, 1965

3,163,959
FISH FEEDING DEVICE
George E. Hollar, 115 D St. SW., Quincy, Wash.
Filed Sept. 20, 1963, Ser. No. 310,395
4 Claims. (Cl. 43—44.99)

This invention relates to an improved bait holding, lowering, and feeding device for fishing at various elevations ranging from five to ten feet down from the water's top to two or three feet above the bottom thereof.

Briefly, it comprises a container having a hinged bottom or lid normally retained in a closed position by a pivoted trip-latch. The container is filled with chum and lowered to the desired fishing spot by a line or an equivalent flexible element. The lower portion of the line is slidingly connected (1) to the axial center of the top of the container and (2) the terminal end is connected to the trip-latch. The hinged portion of the bottom is provided with a detent releasably engaged by the lower end of the latch. When the loaded container descends to the desired level, the line is forcibly yanked until the latch releases the detent, whereupon the bottom opens and the bait is discharged.

One improvement resides in a simple can-type container wherein a hinged lid functions as the bait holding and dumping means. The lid is novel in that a limited marginal portion has a radially projecting extension pivoted on a bracket and providing a retainer or detent. The latch is also carried by said bracket and has a lateral foot at the lower end releasably engaging the detent.

The latch is particularly unique in that the upper end cooperates with a simple eye affixed to the top of the container. With this arrangement, the lower end of the lifting and lowering line is threaded slidingly through the eye and the terminal end is connected to the upper end of the latch. Accordingly, the line is used for lowering, lifting and latch-releasing purposes.

A further improvement has to do with the dual purpose bracket. This bracket is fixed on one side of the can or container adjacent the openable bottom and is such in construction that the median portion of the lever is pivotally mounted thereon. A lower end portion of the bracket projects below the bottom and provides a simple mounting for a marginal extension on the aforementioned hinged bottom; that is, the lid-like wall which constitutes the bottom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
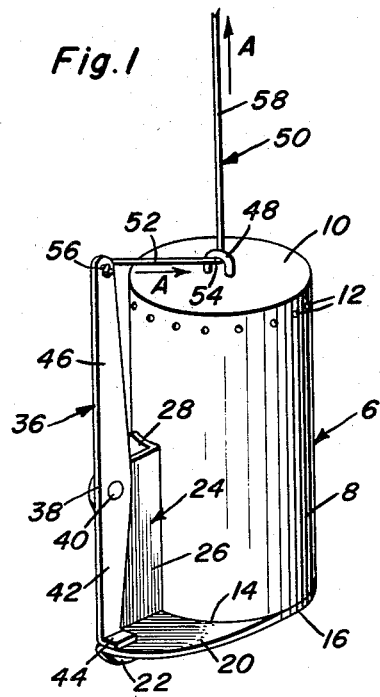
FIG. 1 is a view in perspective of a fish feeding device with the bottom of the container closed and held in its closed position by the engaged but trippable latch.
Figure 2:
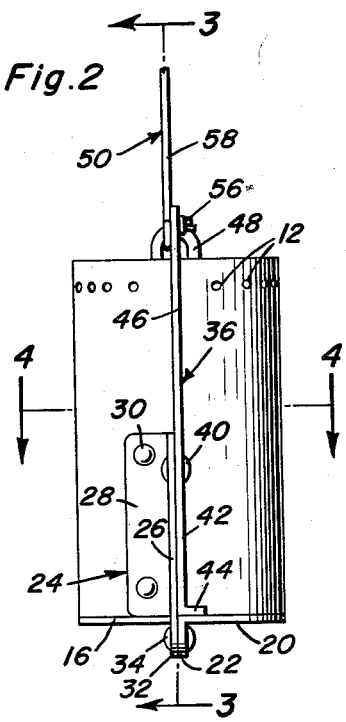
FIG. 2 is a view in elevation observing the structure of FIG. 1 in a direction from left to right.

The container comprises a simple non-corrodible can. The size and material (sheet metal or plastic material) will be established by the manufacture. In any event, the container or can is denoted by the numeral 6. It has a cylindrical body portion 8 and an imperforate top wall 10 and a row of apertures or ports 12 just below the level of the top wall 10. The lower or bottom end is open as at 14. A simple circular lid or cover 16 provides a suitable bottom. The top side of the latter is provided with a disc-like counterweight 18 which, when the lid is closed projects or telescopes into the container space. It will be noted that a limited marginal portion of this lid or cover is provided with an outstanding wing-like extension 20 which projects radially beyond the container where it is provided with a depending segmental flange 22 which is supported by the dual purpose bracket 24. This bracket comprises a simple elongated plate 26 having a lateral flange 28 which is superimposed on the can or container body and riveted or otherwise fixed in place as denoted at 30. It will be further noted that a lower end portion of the plate 26 depends, as at 32 below the level of the container bottom. The aforementioned flange 22 is superimposed on this end portion and is hingedly connected, as at 34.

The trip-latch comprises a vertically elongated lever 36, the median portion 38 of which is superimposed upon and pivoted as at 40 to the upper part of the plate 26. A depending leg 42 of the latch or lever has a laterally directed foot 44 which constitutes a trip and is normally but releasably engageable with the underlying detent 20. The upper leg or half-portion 46 of the lever projects when in the position shown to a level above the container top 10. The container top is provided at its center with a fixed U-shaped clevis 48 which constitutes a supporting eye. The lifting and lowering line 50 has an end portion 52 threaded as at 54 through the opening in the eye and then laterally directed and with its terminal 56 connected to the leg 46. The portion 58 of the line constitutes the portion held by the person who lowers the loaded or baited container into the water which is being fished.

In actual practice, the user of the device loads the can or container 6 with chum. Then the lid or cover is swung to a closed position, the position shown in full lines in the views of the drawing. Before casting the baited device in the water to descend the latch means 36 is, of course, engaged. This is to say, the trippable foot 44 is engaged with the coacting portion of the extension or detent 20 and the device made ready to serve its intended purpose. Assuming that the line 50 is rigged as illustrated, it will be evident that the user will, of course, lower the ready-to-function device in the water being fished.

Figure 3:
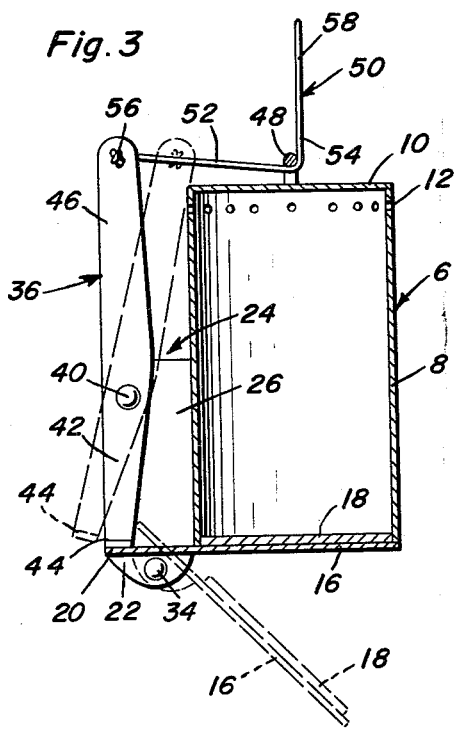
FIG. 3 is a view with parts in elevation taken on the vertical section line 3—3 of FIG. 2.
Figure 4:
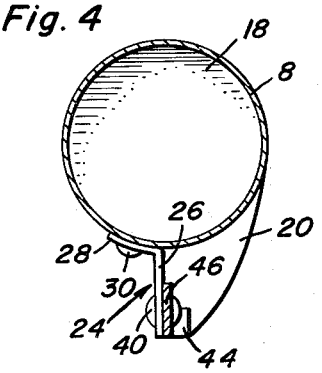
FIG. 4 is a horizontal section on the section line 4—4 of FIG. 2.

Assuming that the user is familiar with the locale, more particularly, the approximate depth of the water, he will then impart the intended sudden pull or, alternatively, yank the line with the result that the pull on the line in the direction of the arrows A will release the latch or lever 36, trip the foot 44 and free the counterweighted lid or bottom 16 so that it will swing from the full line to the phantom line position illustrated in FIG. 3. When in this position, the bait will be freed and allowed to gravitate to the water's bottom.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fish feeding device comprising an open bottom can-like bait container having an imperforate top, the central portion of said top being provided with a line attaching eye, a bracket mounted on a side portion of said container, said bracket embodying a plate with a portion depending below said open bottom, a closing lid having a counterweight, said counterweight projecting into said container and having a normal tendency to swing the lid downwardly and outwardly to assume an open position, said lid being marginally provided with an extension constituting a detent and said extension having a portion thereof superimposed on and hingedly joined to the lower portion of said plate, a lever pivotally mounted intermediate its ends on said plate, said lever constituting a latch and having a lower leg portion terminating in a detent retaining and releasing foot, said foot being releasably engaged with said detent, and a lifting and lowering line having a portion slidingly threaded through the eye and a terminal portion connected to the cooperating upper end portion of said lever.

2. A fish feeding device comprising an open bottom can constituting a container for chum or the like, said container being closed at its top and provided centrally with a line attaching eye, a bracket mounted on and projecting beyond a side of the lower part of the container, said bracket embodying a plate, said plate having a lower end portion projecting below the level of the open bottom of the container, a lid having a body portion spanning and closing the bottom of the container and provided with a counterweight, said counterweight projecting into the space of the container, the marginal portion of said lid being provided with a radial extension constituting a detent, said detent having a depending segmental member superimposed on and hingedly joined to the bottom portion of said plate, a lever pivoted on said plate having a lower end portion engageable with said detent, having an upper end portion projecting above the upper end of the container, and a lifting and lowering line slidingly threaded through said eye having a terminal end portion attached to the upper end portion of said lever.

3. A fish feeding device comprising a container having a body portion provided adjacent an upper end thereof with perforations, having an imperforate top, said container being open at its bottom, a lid normally covering and closing the bottom, and means hingedly mounting a portion of said lid on a cooperating bottom portion of said container, said means comprising a bracket fixedly mounted on said container, a lever having a median portion pivoted on said bracket, said lever constituting a latch and having trippable engagement at a lower end thereof with detent means provided therefor on said lid, a lifting, lowering and latch-tripping line having a lower portion slidingly connected to the top of said container and having a terminal end portion operatively connected with a cooperating upper trippable end of said lever.

4. A fish feeding device comprising a can-like bait container having an imperforate top provided centrally with an upstanding line attaching and accommodating eye, said container being open at the bottom, a bracket mounted exteriorly and fixed on one side portion of said container, said bracket having a portion depending below said open bottom, a closing lid normally covering and closing the bottom, said closing lid having a counterweight adapted to swing the lid downwardly and outwardly to assume a normal open position, said lid being provided with an outstanding detent on a marginal portion thereof, said detent being hingedly mounted on the depending portion of said bracket, a lever disposed in a position alongside said container and having a median portion pivotally mounted on said bracket, said lever constituting a latch and having a lower end portion provided with a foot engageable with said detent, having an upper end portion projecting above the upper closed end of the container for cooperation with said eye, and a line having a lower end portion attached to the upper end portion of said lever and having an adjacent portion passing slidably through said eye.

References Cited in the file of this patent
UNITED STATES PATENTS

| | | |
|---|---|---|
| 413,062 | Howard | Oct. 15, 1889 |
| 2,435,011 | Mason | Jan. 27, 1948 |
| 2,779,125 | Reitzel | Jan. 29, 1957 |
| 2,941,327 | Rundell | June 21, 1960 |